(12) United States Patent
Shibata

(10) Patent No.: US 11,039,035 B2
(45) Date of Patent: Jun. 15, 2021

(54) SIGNAL PROCESSING CIRCUIT, IMAGE READING APPARATUS, AND IMAGE FORMING APPARATUS

(71) Applicant: CANON KABUSHIKI KAISHA, Tokyo (JP)

(72) Inventor: Masanori Shibata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/793,014

(22) Filed: Feb. 18, 2020

(65) Prior Publication Data

US 2020/0288034 A1 Sep. 10, 2020

(30) Foreign Application Priority Data

Mar. 6, 2019 (JP) .............................. JP2019-040596

(51) Int. Cl.
| | | |
|---|---|---|
| *H04N 1/193* | (2006.01) | |
| *H04N 1/191* | (2006.01) | |
| *H04N 1/04* | (2006.01) | |
| *H04N 1/047* | (2006.01) | |

(52) U.S. Cl.
CPC ............ *H04N 1/193* (2013.01); *H04N 1/047* (2013.01); *H04N 1/0446* (2013.01); *H04N 1/1912* (2013.01); *H04N 1/1918* (2013.01)

(58) Field of Classification Search
CPC ............. H04N 1/1017; H04N 1/40056; H04N 1/6008; H04N 1/047; H04N 1/1918; H04N 1/1912; H04N 1/0446; H04N 1/193; G06F 1/266; H04L 1/0066; H04L 1/0071; H04Q 2209/43; H04Q 2209/88; H04Q 2209/883; H04Q 2209/886; H04Q 9/00; H04Q 9/02; H04W 52/0258; H04W 72/005; H04W 88/08; Y02D 30/70; Y02D 70/00
USPC .......................................................... 358/474
See application file for complete search history.

(56) References Cited

U.S. PATENT DOCUMENTS

| | | | | |
|---|---|---|---|---|
| 6,256,509 | B1* | 7/2001 | Tanaka ................ | H04W 72/005 455/515 |
| 8,321,436 | B2* | 11/2012 | Inoue .................. | G06F 21/6254 707/758 |
| 9,921,559 | B2* | 3/2018 | Tsubota ................ | G05B 19/00 |
| 10,659,655 | B2* | 5/2020 | Suzuki .................. | H04N 1/401 |
| 2003/0007196 | A1* | 1/2003 | Ishimaru ............ | H04N 1/00795 358/486 |

(Continued)

FOREIGN PATENT DOCUMENTS

JP          2004-40146          2/2004

*Primary Examiner* — Negussie Worku
(74) *Attorney, Agent, or Firm* — Venable LLP

(57) ABSTRACT

Provided is a signal processing circuit including: a first terminal to which a control signal including identifier information indicating a control target is input; a determination circuit configured to determine the control target based on the identifier information; and a second terminal that is different from the first terminal. When the determination circuit determines that the control target is the signal processing circuit, the signal processing circuit performs a process in accordance with the control signal. When the determination circuit does not determine that the control target is the signal processing circuit, the signal processing circuit outputs the control signal from the second terminal.

12 Claims, 10 Drawing Sheets

(56) References Cited

U.S. PATENT DOCUMENTS

| | | | |
|---|---|---|---|
| 2006/0126126 A1* | 6/2006 | Kondo | H04N 19/176 358/463 |
| 2010/0284046 A1* | 11/2010 | Fah | H04N 1/17 358/474 |
| 2010/0289931 A1* | 11/2010 | Shibata | H04N 5/378 348/294 |
| 2014/0255017 A1* | 9/2014 | Shibata | G02B 7/04 396/125 |
| 2015/0264213 A1* | 9/2015 | Tai | H04N 1/40056 358/509 |
| 2016/0039200 A1* | 2/2016 | Shibata | B41J 2/37 347/19 |
| 2018/0091695 A1* | 3/2018 | Suzuki | H04N 1/40056 |
| 2018/0262640 A1* | 9/2018 | Shima | H04N 1/1938 |

* cited by examiner

SIGNAL PROCESSING CIRCUIT, IMAGE READING APPARATUS, AND IMAGE FORMING APPARATUS

BACKGROUND OF THE INVENTION

Field of the Invention

The present invention relates to a signal processing circuit, an image reading apparatus, and an image forming apparatus.

Description of the Related Art

Japanese Patent Application Laid-Open No. 2004-40146 discloses an image reading apparatus including a CCD image sensor, an analog front end IC, and an ASIC. The ASIC includes an AFE control unit and a CCD control unit. The AFE control unit controls the analog front end IC, and the CCD control unit controls the CCD image sensor.

In a configuration in which multiple devices are controlled by a single control device as disclosed in Japanese Patent Application Laid-Open No. 2004-40146, there may be a problem of an increase in a circuit size due to a large number of control signal lines from a control circuit.

SUMMARY OF THE INVENTION

The present invention intends to provide a signal processing circuit, an image reading apparatus, and an image forming apparatus that can reduce the number of control signal lines.

According to one aspect of the present invention, provided is a signal processing circuit including: a first terminal to which a control signal including identifier information indicating a control target is input; a determination circuit configured to determine the control target based on the identifier information; and a second terminal that is different from the first terminal. When the determination circuit determines that the control target is the signal processing circuit, the signal processing circuit performs a process in accordance with the control signal. When the determination circuit does not determine that the control target is the signal processing circuit, the signal processing circuit outputs the control signal from the second terminal.

According to another aspect of the present invention, provided is a signal processing circuit including: a first terminal to which a control signal including identifier information indicating a control target is input; a determination circuit configured to determine the control target based on the identifier information; and a second terminal that is different from the first terminal. When the determination circuit determines that the control target is the signal processing circuit, the signal processing circuit performs a process in accordance with the control signal. When the determination circuit determines that the control target is a circuit other than the signal processing circuit, the signal processing circuit outputs the control signal from the second terminal.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. The same components or corresponding components are labeled with common references throughout a plurality of drawings, and the description thereof may be omitted or simplified.

First Embodiment

Figure 1:
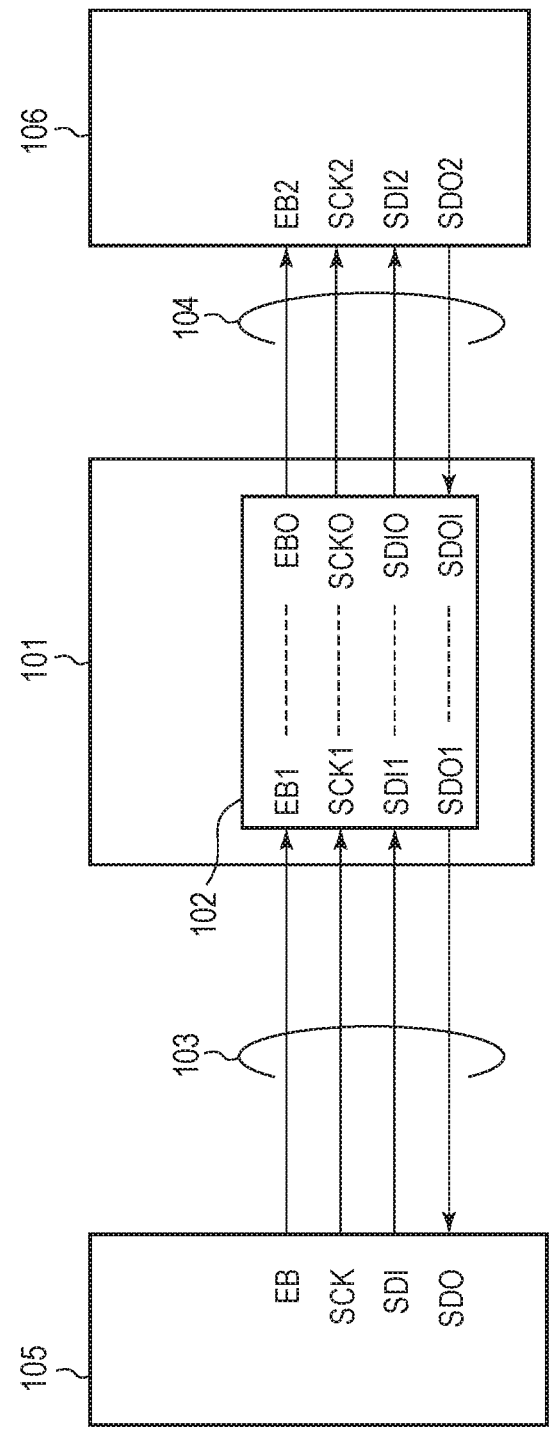
FIG. 1 is a block diagram illustrating a configuration of an imaging device according to a first embodiment.

FIG. 1 is a block diagram illustrating a configuration of an imaging device including an analog front end circuit (hereafter, referred to as an AFE circuit) according to a first embodiment. The imaging device has an AFE circuit 101, a transmission line group 103, an output line group 104, a control circuit 105, and an image pickup device 106. The AFE circuit 101 has a determination circuit 102.

The imaging device of the present embodiment is a device that acquires an image based on an incident light to the image pickup device 106. For example, the image pickup device 106 is a photoelectric conversion device such as a complementary metal oxide semiconductor (CMOS) image sensor, a charge coupled device (CCD) image sensor, or the like. The control circuit 105 is a processor having a function of controlling the AFE circuit 101 and the image pickup device 106 and may be, for example, a central processing unit (CPU), a graphics processing unit (GPU), or the like. The control circuit 105 may be an application specific integrated circuit (ASIC), a field-programmable gate array (FPGA), or the like.

The AFE circuit 101 is a signal processing circuit having a function of acquiring identifier information of a control signal output from the control circuit 105 and transferring the acquired identifier information to the image pickup device 106, an analog-to-digital (AD) conversion function of acquiring an analog signal from the image pickup device 106 and converting the acquired analog signal into a digital signal, or the like. The determination circuit 102 is connected to the control circuit 105 via the transmission line group 103. Further, the determination circuit 102 is connected to the image pickup device 106 via the output line group 104.

Each of the transmission line group 103 and the output line group 104 includes a plurality of control signal lines. The transmission line group 103 and the output line group 104 include signal control lines corresponding to a serial peripheral interface (SPI) that is a standard for serial communication, for example.

The determination circuit 102, the control circuit 105, and the image pickup device 106 have a plurality of terminals corresponding to the SPI. The control circuit 105 has terminals EB, SCK, SDI, and SDO. The determination circuit 102 has terminals EB1, SCK1, SDI1, SDO1, EBO, SCKO, SDIO, and SDOI. The image pickup device 106 has terminals EB2, SCK2, SDI2, and SDO2. The terminals EB, SCK, SDI, and SDO of the control circuit 105 are connected to the terminals EB1, SCK1, SDI1, and SDO1 of the determination circuit 102 via the transmission line group 103, respectively. The terminals EBO, SCKO, SDIO, SDOI of the determination circuit 102 are connected to the terminals EB2, SCK2, SDI2, SDO2 of the image pickup device 106 via the output line group 104, respectively. Each of the terminals EB1, SCK1, and SDI1 of the determination circuit 102 to which control signals are input may be referred to as a first terminal, and each of the terminals EBO, SCKO, and SDIO of the determination circuit 102 from which control signals are output may be referred to as a second terminal.

A signal output from the terminal EB and input to the terminal EB1 and a signal output from the terminal EBO and input to the terminal EB2 are control signals that control start and end of communication. A signal output from the terminal SCK and input to the terminal SCK1 and a signal output from the terminal SCKO and input to the terminal SCK2 are control signals used for clock. A signal output from the terminal SDI and input to the terminal SDI1 and a signal output from the terminal SDIO and input to the terminal SDI2 are control signals that are written to the AFE circuit 101 or the image pickup device 106 from the control circuit 105. A signal output from the terminal SDO2 and input to the terminals SDOI and a signal output from the SDO1 and input to the terminal SDO are data signals that are read from the AFE circuit 101 or the image pickup device 106 to the control circuit 105.

An overview of the operation of the AFE circuit 101, the control circuit 105, and the image pickup device 106 of the present embodiment will be described. The control circuit 105 transmits control signals used for driving the AFE circuit 101 and the image pickup device 106 to the AFE circuit 101 via the transmission line group 103. These control signals are output from the terminals EB, SCK, and SDI and input to the terminals EB1, SCK1, and SDI1.

Figure 2:
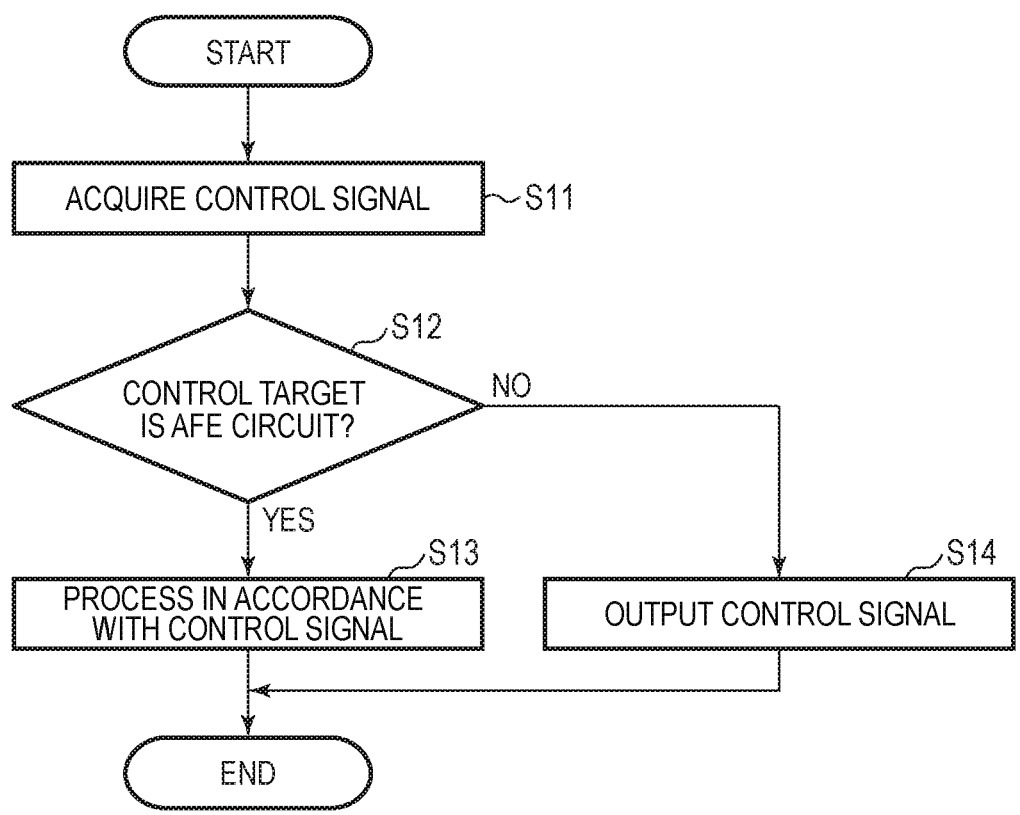
FIG. 2 is a flowchart illustrating an overview of a process in an AFE circuit according to the first embodiment.

FIG. 2 is a flowchart illustrating an overview of a process in the AFE circuit 101 according to the present embodiment. The overview of the process in the AFE circuit 101 will be described with reference to FIG. 2. In step S11, the AFE circuit 101 acquires a control signal including identifier information regarding a control target from the control circuit 105. In step S12, the determination circuit 102 determines whether or not the control target of the received control signal is the AFE circuit 101 based on identifier information included in the received control signal.

If it is determined that the control target of the received control signal is the AFE circuit 101 (step S12, YES), the process proceeds to step S13. In step S13, the AFE circuit 101 writes a control signal to a register stored in the AFE circuit 101, and the AFE circuit 101 performs a process in accordance with this control signal. Note that, in this step, no control signal is output from the determination circuit 102. As a specific example of a process performed by the AFE circuit 101 may be a process of performing analog-to-digital conversion (AD conversion) to convert an analog signal output from the image pickup device 106 into a digital signal and outputting the digital signal to the control circuit 105.

If it is not determined that the control target of the received control signal is the AFE circuit 101 (step S12, NO), the process proceeds to step S14. In step S14, the determination circuit 102 outputs control signals from the terminals EBO, SCKO, and SDIO. The control signals are transmitted via the output line group 104 and input to the terminals EB2, SCK2, and SDI2 of the image pickup device 106. The case where it is not determined that the control target of the received control signal is the AFE circuit 101 may be, for example, a case where it is determined that the control target of the received control signal is a circuit other than the AFE circuit 101. A circuit other than the AFE circuit 101 is the image pickup device 106 in the present embodiment. Further, the case where it is not determined that the control target of the received control signal is the AFE circuit 101 may include a case where the determination circuit 102 does not perform determination in accordance with control of an enable signal or the like.

In the present embodiment, since the control target of a control signal is determined by the determination circuit 102, the control signal line directly connected from the control circuit 105 to the image pickup device 106 is unnecessary. In other words, control signal lines used for transmitting control signals from the control circuit 105 can be aggregated to the transmission line group 103 forming a group. Accordingly, the number of control signal lines extending from the control circuit 105 is reduced, and the circuit size can be reduced.

The operation of the AFE circuit 101, the control circuit 105, and the image pickup device 106 of the present embodiment will be more specifically described with reference to FIG. 3 to FIG. 6. The references EB1, SCK1, and SDI1 in FIG. 3 to FIG. 6 denote control signals output from the terminals EB, SCK, and SDI of the control circuit 105 and input to the terminals EB1, SCK1, and SDI1 of the determination circuit 102, respectively. The reference SDO1 in FIG. 3 to FIG. 6 denotes a control signal output from the terminal SDO1 of the determination circuit 102 and input to the terminal SDO of the control circuit 105. The references EB2, SCK2, and SDI2 in FIG. 3 to FIG. 6 denote control signals output from the terminals EBO, SCKO, and SDIO of the determination circuit 102 and input to the terminals EB2, SCK2, and SDI2 of the image pickup device 106, respectively. The reference SDO2 in FIG. 3 to FIG. 6 denotes a data signal output from the terminal SDO2 of the image pickup device 106 and input to the terminal SDOI of the determination circuit 102. In the following description, the control signals input to and output from these terminals may be labeled with references of corresponding terminals and thereby may be simply referred to as control signals EB1, SCK1, SDI1, SDO1, EB2, SCK2, SDI2, SDO2, or the like.

Each of the control signals SDI1 and SDI2 is a digital signal that may include an identifier bit CS, a mode selection bit W, address bits, and data bits. The identifier bit CS represents identifier information indicating a control target. The mode selection bit W represents mode select information indicating whether a process of writing of data to a register or a process of reading of data from a register is to be performed. The address bits represent an address of a register where writing or reading is performed. In the present embodiment, the number of bits of each of the identifier bit CS and the mode selection bit W is one. Further, the number of bits of the address bits is six, and the number of bits of the data bits is nine. Each of the control signals SDI1 and SDI2 is transferred in the order of the identifier bit CS, the mode selection bit W, the address bits, and the data bits. To enable determination of a control signal and selection of a mode before receiving address bits and data bits, the identifier bit CS and the mode selection bit W are arranged preceding the address bits and the data bits.

Each of the control signals EB1 and EB2 controls timings of start and end of communication. When the control signal EB1 is at a high level, serial communication between the AFE circuit 101 and the control circuit 105 is in an initialized state. Further, when the control signal EB2 is at a high level, serial communication between the AFE circuit 101 and the image pickup device 106 is in an initialized state.

First, the relationship between the number of rising edges of the control signal SCK1 and a process of writing or reading of data will be described. In response to transition of the control signal EB1 from the high level to the low level, serial communication between the AFE circuit 101 and the control circuit 105 is enabled. When the number of rising edges of the control signal SCK1 after the transition is the same as the total number of bits of the identifier bit CS, the mode selection bit W, the address bits, and the data bits, the AFE circuit 101 enables writing or reading of data to or from the register in the AFE circuit 101.

Figure 3:
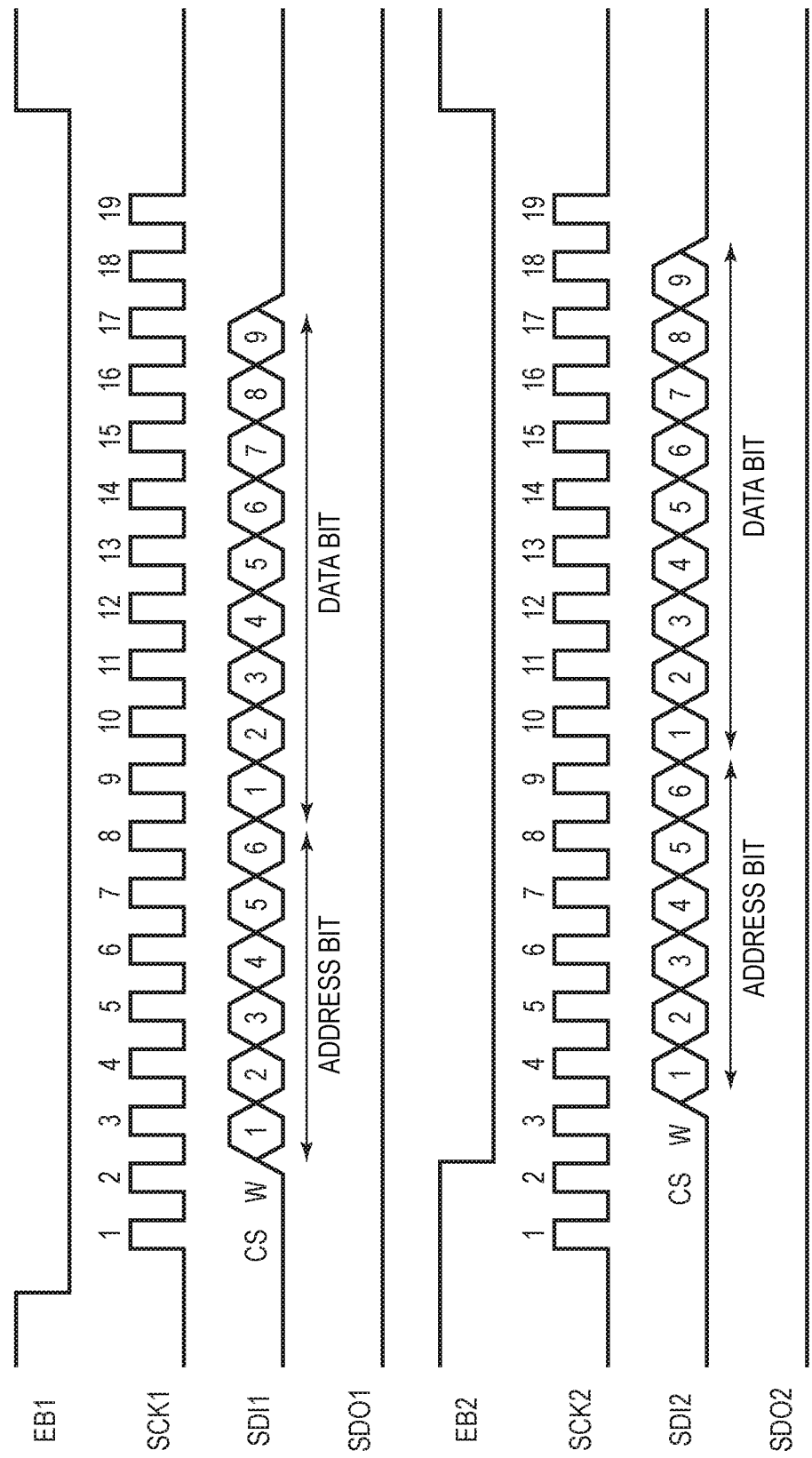
FIG. 3 is a timing diagram in a writing mode for writing to an image pickup device according to the first embodiment.

In the example of FIG. 3, when the number of rising edges of the control signal SCK1 is 17, writing or reading of data to or from the register in the AFE circuit 101 is enabled. That is, when the number of rising edges of the control signal SCK1 is less than 17, neither writing nor reading of data to or from the register in the determination circuit 102 is performed. When the number of rising edges of the control signal SCK1 is 17 or exceeds 17, writing or reading of data is performed to or from the register in the AFE circuit 101 until the number of rising edges of the control signal SCK1 becomes 17. In this case, no process is performed on data on and after 18th rising edge.

Next, the relationship between the number of rising edges of the control signal SCK2 and a process of writing or reading of data will be described. In response to transition of the control signal EB2 from the high level to the low level, serial communication between the AFE circuit 101 and the image pickup device 106 is enabled. When the number of rising edges of the control signal SCK2 after the transition is the same as the total number of bits of the identifier bit CS, the mode selection bit W, the address bits, and the data bits, the image pickup device 106 enables writing or reading of data to or from the register in the image pickup device 106.

In the case of the present embodiment, when the number of rising edges of the control signal SCK2 is 16, writing or reading of data to or from the register in the image pickup device 106 is enabled. That is, when the number of rising edges of the control signal SCK2 is less than 16, neither writing nor reading of data to or from the register in the image pickup device 106 is performed. When the number of rising edges of the control signal SCK2 is 16 or exceeds 16, writing or reading of data is performed to or from the register in image pickup device 106 until the number of rising edges of the control signal SCK2 becomes 16. In this case, no process is performed on data on and after 17th rising edge.

Next, a difference in process details in accordance with the levels of the identifier bit CS and the mode selection bit W will be described. When the identifier bit CS is at the low level, the determination circuit 102 determines that the control target of the input control signal is the image pickup device 106. When the identifier bit CS is at the high level, the determination circuit 102 determines that the control target of the input control signal is the AFE circuit 101. When the mode selection bit W is at the low level, the AFE circuit 101 or the image pickup device 106 is in a writing mode in which writing to the register can be performed. When the mode selection bit W is at the high level, the AFE circuit 101 or the image pickup device 106 is in a reading mode in which reading from the register can be performed. Therefore, the imaging device performs any of processes of "writing to the image pickup device 106", "writing to the AFE circuit 101", "reading from the image pickup device 106", and "reading from the AFE circuit 101" based on the identifier bit CS and the mode selection bit W. Each process will be described below with reference to FIG. 3 to FIG. 6.

FIG. 3 is a timing diagram in the writing mode for writing to the image pickup device 106. In the example of FIG. 3, since the identifier bit CS is at the low level and the mode selection bit W is at the low level, the determination circuit 102 determines that the mode is the writing mode for writing to the image pickup device 106. In such a case, the AFE circuit 101 does not perform wiring of a control signal to the register in the AFE circuit 101. Further, control signals input to the AFE circuit 101 are output from the terminals EBO, SCKO, and SDIO to the image pickup device 106 via the output line group 104.

The image pickup device 106 writes the mode selection bit W, the address bits, and the data bits included in the input control signal SDI2 to the register in the image pickup device 106. Since the AFE circuit 101 transmits the input control signal directly to the image pickup device 106, the identifier bit CS is also input to the image pickup device 106. The image pickup device 106 recognizes the leading bit of the control signal SDI2 as the mode selection bit W. Thus, if the control signal SDI2 is directly used, the image pickup device 106 may erroneously recognize the identifier bit CS of the control signal SDI2 as the mode selection bit W. Accordingly, the determination circuit 102 adjusts the time of a falling edge of the control signal EB2 so that the identifier bit CS is masked and thereby the image pickup device 106 does not recognize the identifier bit CS of the control signal SDI2. Specifically, the determination circuit 102 delays a timing of a falling edge of the control signal EB2 up to a timing of a falling edge of the second clock of the control signal SCK2. In such a way, the determination circuit 102 masks the identifier bit CS by using the control signal EB2, and thereby the image pickup device 106 recognizes the leading bit as the mode selection bit W instead of the identifier bit CS.

Note that the determination circuit 102 acquires the control signal SDI1 at the timing of a rising edge of the control signal SCK1 and outputs the control signal SDI1 in synchronization with the timing of a falling edge of the control signal SCK1. Thus, the timing when the determination circuit 102 outputs the control signal to the image pickup device 106 is delayed by one clock of the control signal SCK1.

Figure 4:
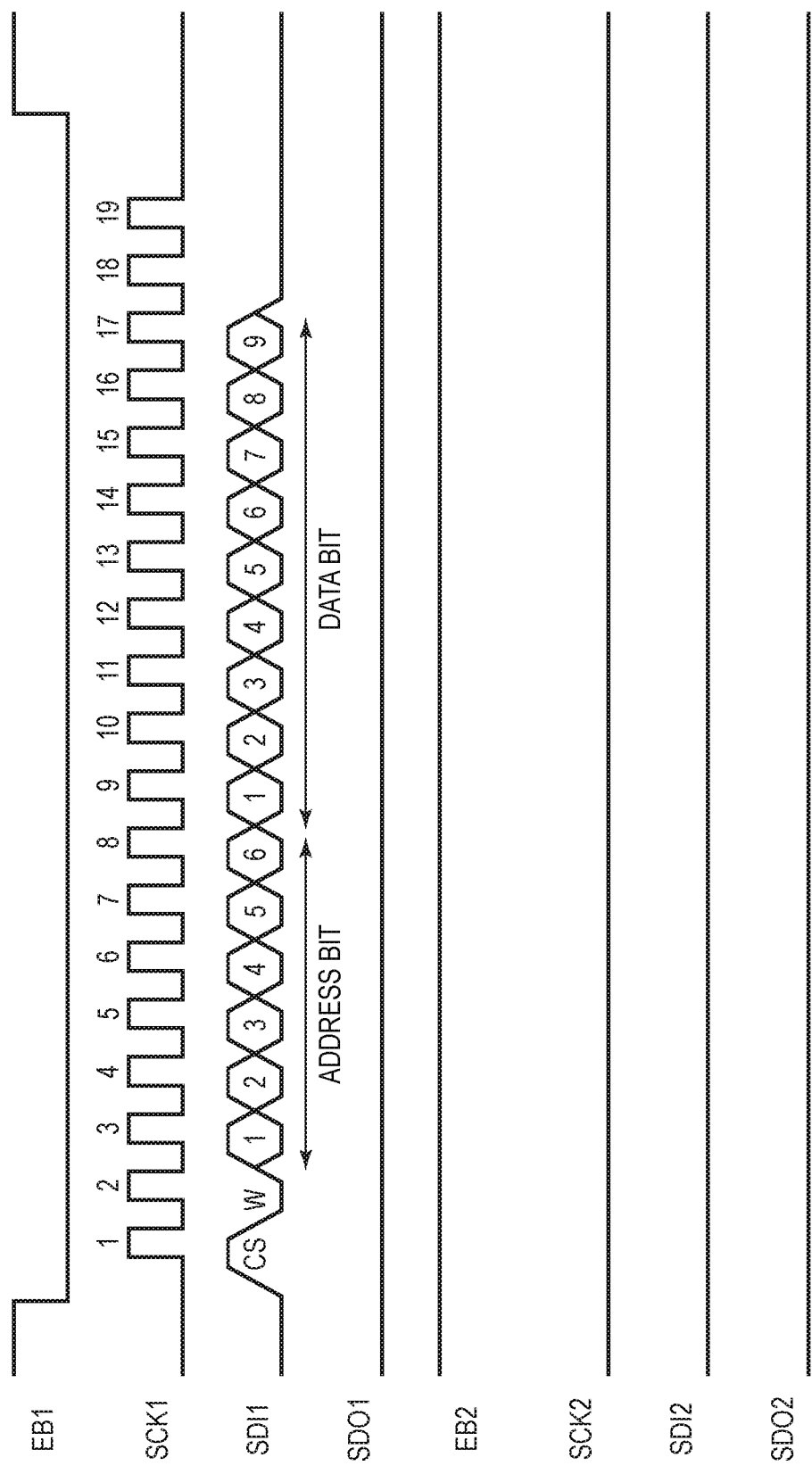
FIG. 4 is a timing diagram in a writing mode for writing to the AFE circuit according to the first embodiment.

FIG. 4 is a timing diagram in the writing mode for writing to the AFE circuit 101. In the example of FIG. 4, since the identifier bit CS is at the high level and the mode selection bit W is at the low level, the determination circuit 102 determines that the mode is the writing mode for writing to the AFE circuit 101. In such a case, the AFE circuit 101 writes a control signal to the register in the AFE circuit 101. Further, the determination circuit 102 disables serial communication with the image pickup device 106 by maintaining the level of the control signal EB2 at the high level.

Accordingly, writing of a control signal is not performed on the register of the image pickup device 106.

Although the control signal EB2 is maintained at the high level and the control signals SCK2 and SDI2 are maintained at the low level in FIG. 4, the levels of these signals are not particularly limited as long as writing of a control signal is not performed on the register of the image pickup device 106. For example, if the control signal EB2 is maintained at the high level, the control signals SCK2 and SDI2 may be the same as illustrated in FIG. 3.

Figure 5:
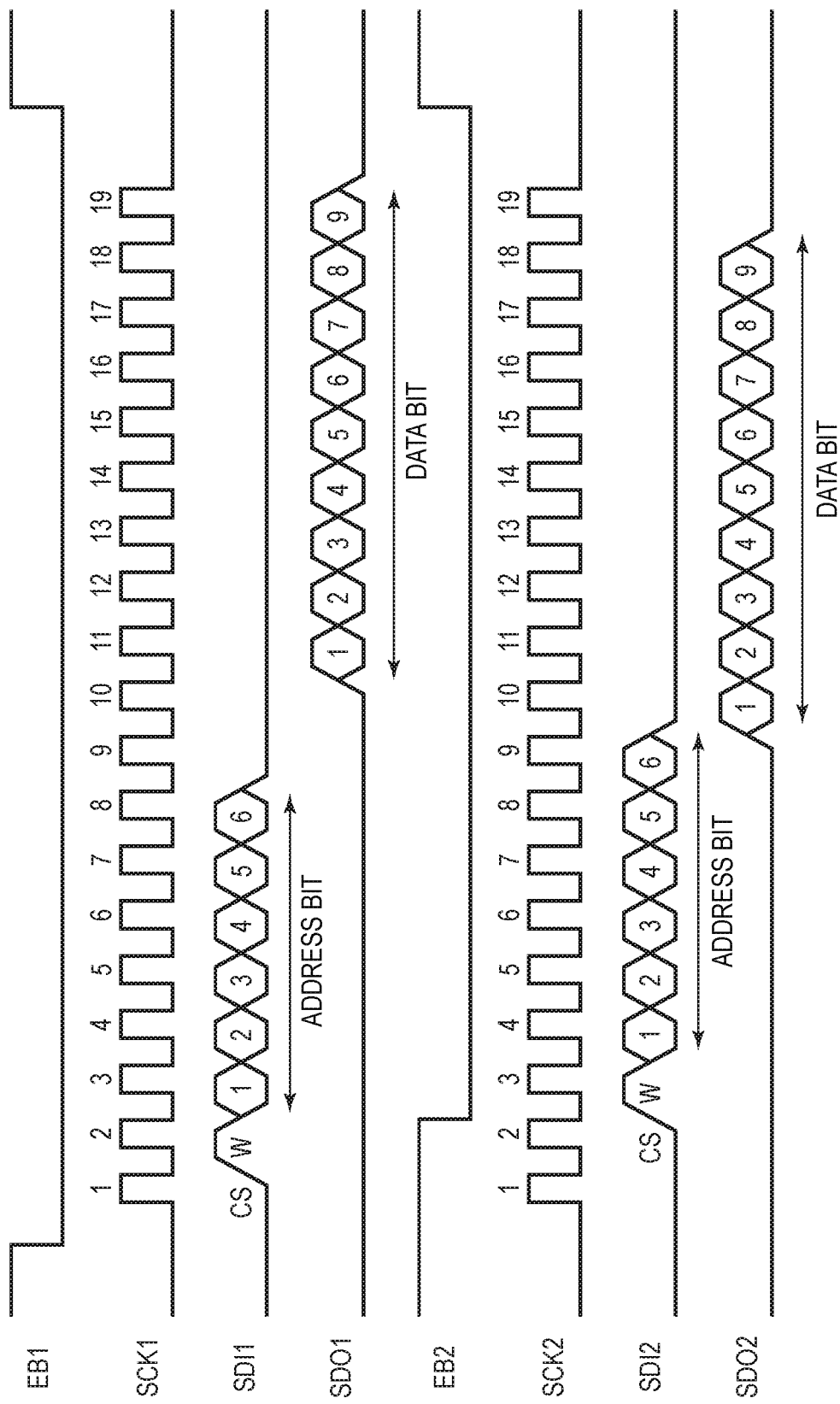
FIG. 5 is a timing diagram in a reading mode for reading from the image pickup device according to the first embodiment.

FIG. 5 is a timing diagram in the reading mode for reading from the image pickup device 106. In the example of FIG. 5, since the identifier bit CS is at the low level and the mode selection bit W is at the high level, the determination circuit 102 determines that the mode is the reading mode for reading from the image pickup device 106. The control signal at the reading mode includes the identifier bit CS, the mode selection bit W, and the address bits. In such a case, the AFE circuit 101 does not perform reading of a control signal from the register in the AFE circuit 101. Further, the control signals input to the AFE circuit 101 are output from the terminals EBO, SCKO, and SDIO to the image pickup device 106 via the output line group 104.

In response to receiving the control signal SDI2, the image pickup device 106 outputs data bits corresponding to the address bits included in the control signal SDI2 from the terminal SDO2 to the terminal SDOI via the output line group 104. The determination circuit 102 passes and outputs the received data bits from the terminal SDO1 to the terminal SDO of the control circuit 105 via the transmission line group 103.

Note that the determination circuit 102 acquires data bits at a timing of a rising edge of the control signal SCK1 and outputs the acquired data bits to the transmission line group 103 in synchronization with a falling edge of the control signal SCK1. Thus, the timing when the determination circuit 102 outputs the data bits to the control circuit 105 is delayed by one clock of the control signal SCK1.

Figure 6:
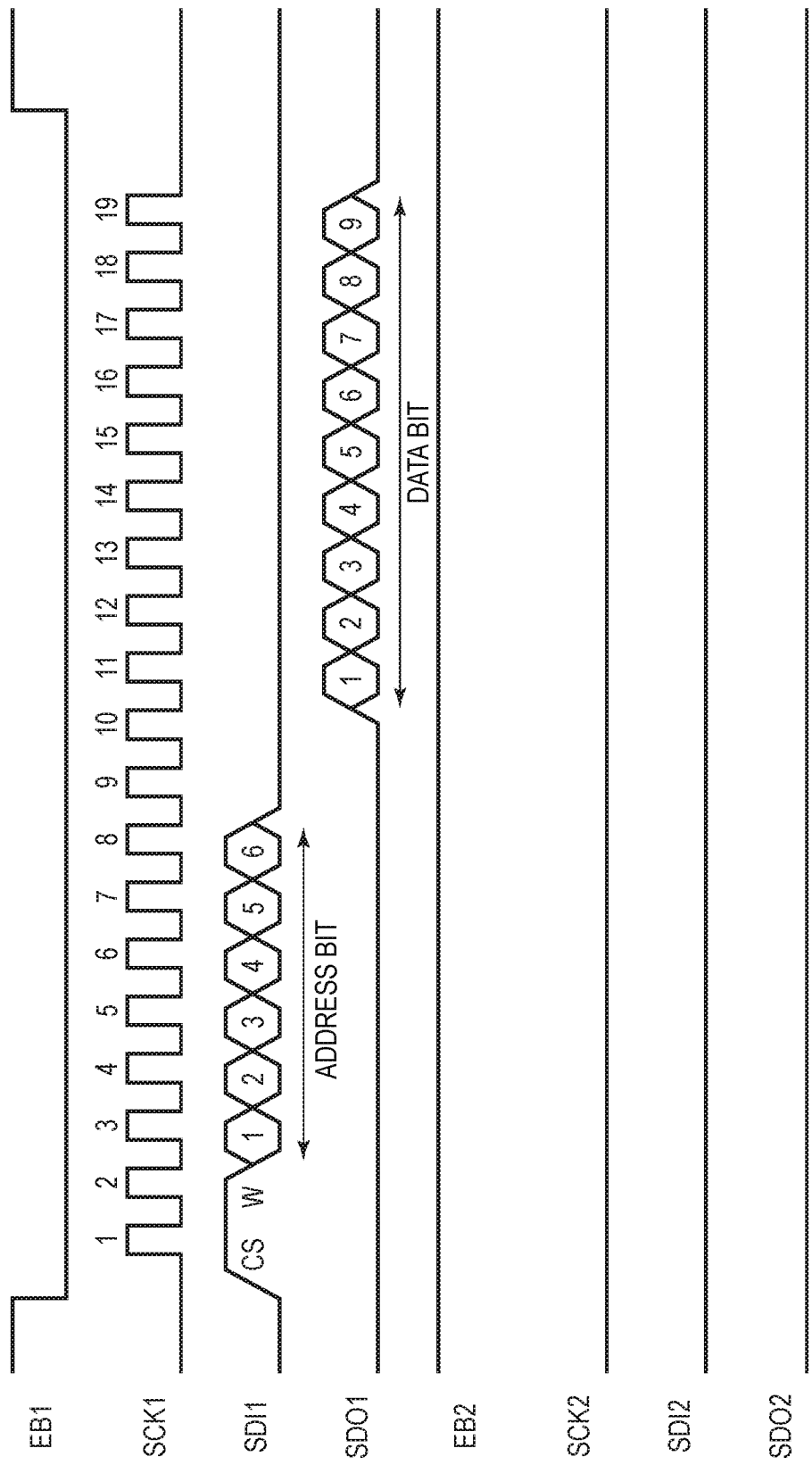
FIG. 6 is a timing diagram in a reading mode for reading from the AFE circuit according to the first embodiment.

FIG. 6 is a timing diagram in a reading mode for reading from the AFE circuit 101. In the example of FIG. 6, since the identifier bit CS is at the high level and the mode selection bit W is at the high level, the determination circuit 102 determines that the mode is the reading mode for reading from the AFE circuit 101. As with the example of FIG. 5, a control signal at the reading mode includes the identifier bit CS, the mode selection bit W, and the address bits. In response to the determination circuit 102 receiving the control signal SDI1, the AFE circuit 101 outputs data bits corresponding to the address bits included in the control signal SDI1 from the terminal SDO1 to the terminal SDO via the transmission line group 103.

Further, the determination circuit 102 disables serial communication with the image pickup device 106 by maintaining the level of the control signal EB2 at the high level. Accordingly, control of reading is not performed on the register of the image pickup device 106.

Although the control signal EB2 is maintained at the high level and the control signals SCK2 and SDI2 are maintained at the low level in FIG. 6, the levels of these signals are not particularly limited as long as control of reading is not performed on the register of the image pickup device 106. For example, if the control signal EB2 is maintained at the high level, the control signals SCK2 and SDI2 may be the same as illustrated in FIG. 5.

As described above, in the present embodiment, since the control target of a control signal is determined by the determination circuit 102, the control signal line used for directly transmitting the control signal from the control circuit 105 to the image pickup device 106 is unnecessary. Accordingly, the number of control signal lines extending from the control circuit 105 is reduced, and the circuit size can be reduced.

Furthermore, the reduced number of control signal lines may reduce crosstalk between control signal lines. Further, when the number of control signal lines is reduced and the number of power source lines and ground lines is increased, transmission noise due to variation of the power source voltage and the ground voltage can be reduced without an increase in the total number of wirings. As described above, when the configuration of the present embodiment is applied to reduce the number of control signal lines, transmission quality of control signals may be improved.

Second Embodiment

Although the image pickup device 106 does not have a function of determining the identifier bit CS in the first embodiment, the image pickup device 106 may have a function of determining the identifier bit CS. In the present embodiment, an example of a case where the image pickup device 106 may have a function of determining the identifier bit CS as with the determination circuit 102 will be described. Note that, in the present embodiment, description of components common to the first embodiment may be omitted or simplified.

Figure 7:
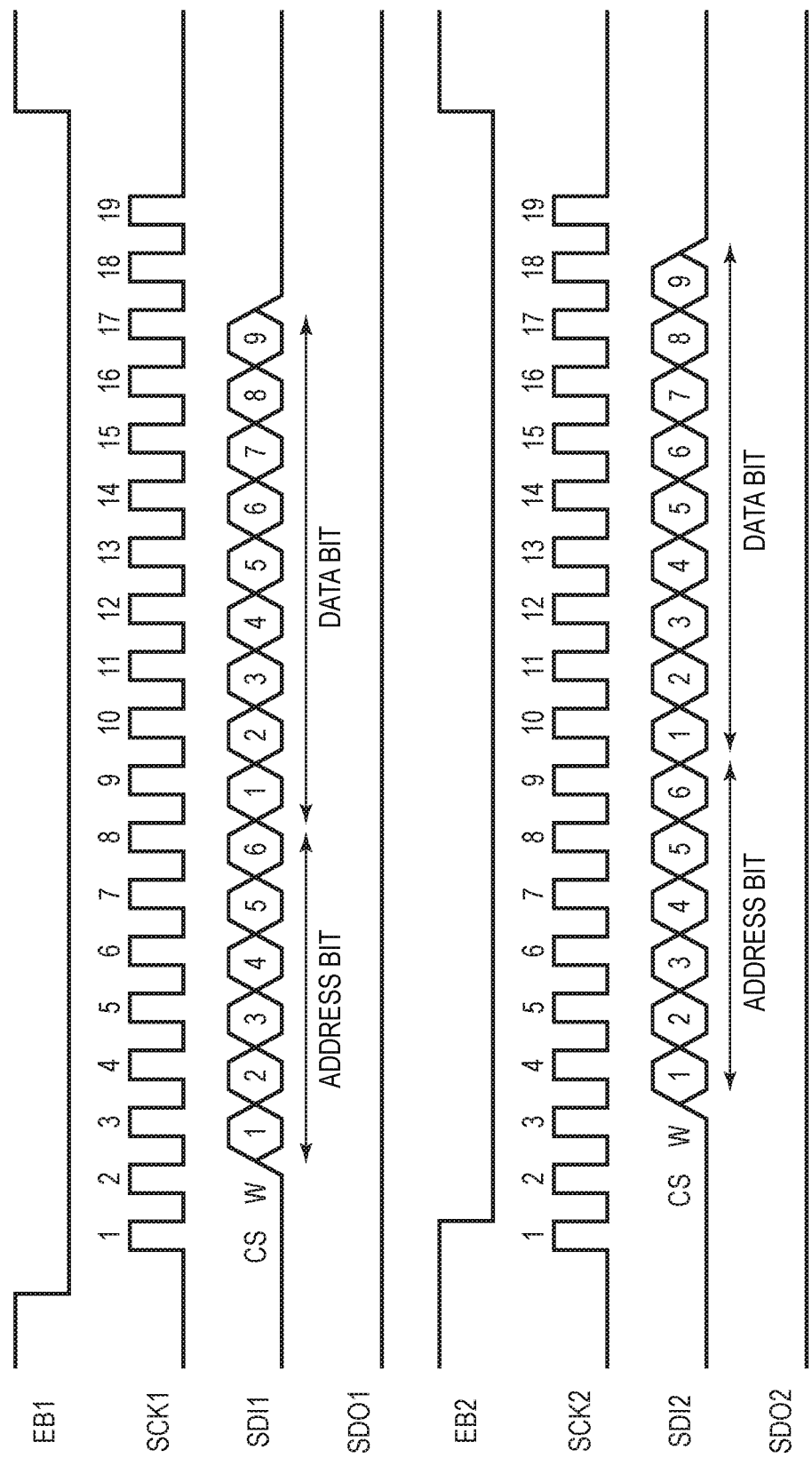
FIG. 7 is a timing diagram in a writing mode for writing to an image pickup device according to a second embodiment.

FIG. 7 is a timing diagram in the writing mode for writing to the image pickup device 106. In the present embodiment, the determination circuit 102 delays the timing of a falling edge of the control signal EB2 up to the timing of a falling edge of the first clock of the control signal SCK2. That is, in the present embodiment, a control signal is transmitted to the image pickup device 106 without the identifier bit CS being masked. The image pickup device 106 determines whether or not the control target of the received control signal is the image pickup device 106 based on the identifier bit CS. In this example, since the identifier bit CS is at the low level, the image pickup device 106 determines that the control target of the received control signal is the image pickup device 106. The image pickup device 106 then performs a process of writing to the register in the image pickup device 106 in the same manner as in the example of FIG. 3. If the control target of the received control signal is not the image pickup device 106, the image pickup device 106 does not perform a process of writing to the register.

Also in the present embodiment, the number of control signal lines extending from the control circuit 105 is reduced, and the circuit size can be reduced as with the case of the first embodiment. Further, for the same reason as in the first embodiment, transmission quality of control signals may be improved.

Note that, although only the writing mode for writing to the image pickup device 106 has been illustrated as an example in the above description, the same determination is performed for the reading mode for reading from the image pickup device 106. Further, in the example of FIG. 7, the determination circuit 102 acquires the control signal SDI1 at a timing of a rising edge of the control signal SCK1 and outputs the acquired control signal SDI1 in synchronization with the timing of a falling edge of the control signal SCK1. Thus, the timing when the determination circuit 102 outputs a control signal to the image pickup device 106 is delayed by one clock of the control signal SCK1. However, the determination circuit 102 may output the control signal SDI1 directly to the image pickup device 106 without performing acquisition of the control signal SDI1. In such a case, the control signal SDI2 is not delayed and is input to the image pickup device 106.

Third Embodiment

In the present embodiment, a more detailed configuration example of the imaging device described in the first embodiment or the second embodiment will be described. The imaging device of the present embodiment may be suitable used for an image reading apparatus. Here, the image reading apparatus may be an image scanner, a copy machine, a multifunction printer, or the like. In the following description, the imaging device of the present embodiment is mounted in the image reading apparatus and functions as a scanner unit used for capturing a document or the like to read an image. Note that, in the present embodiment, description of components common to those of the first embodiment or the second embodiment may be omitted or simplified.

Figure 8:
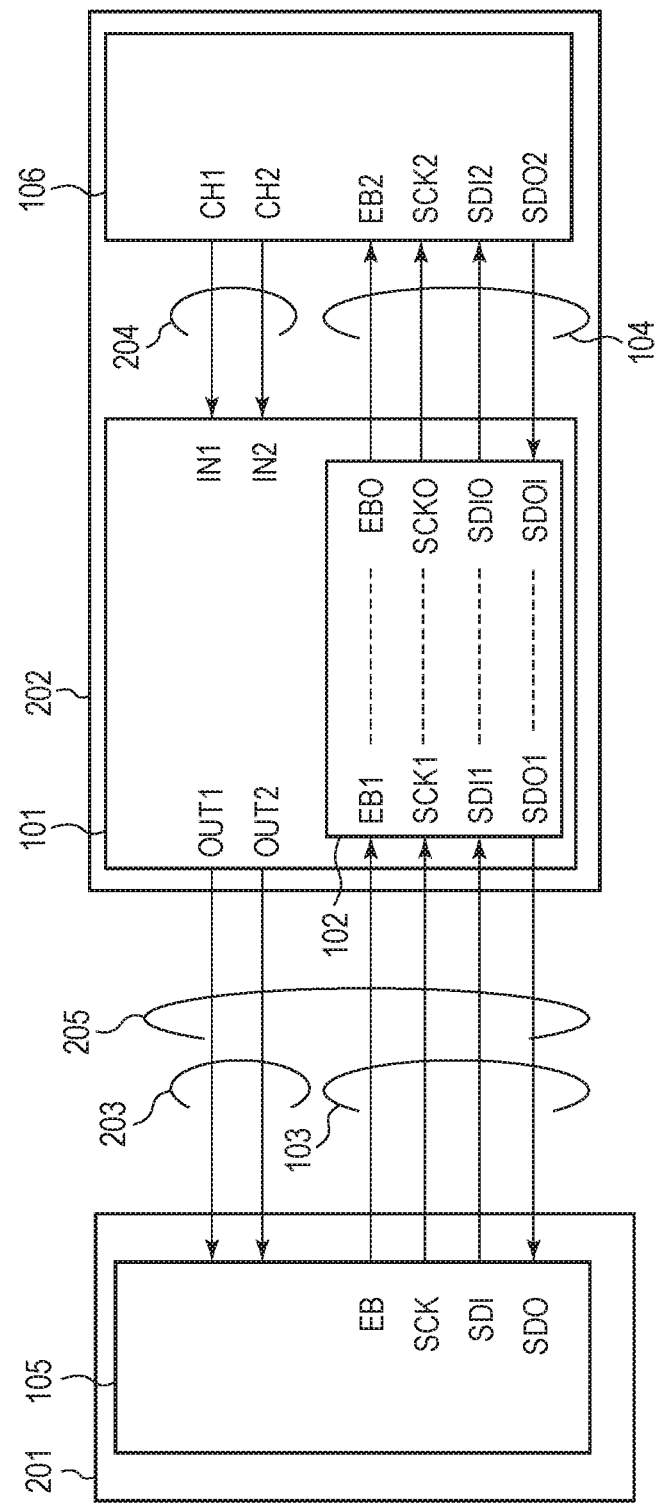
FIG. 8 is a block diagram illustrating a configuration of an imaging device according to a third embodiment.

FIG. 8 is a block diagram illustrating the configuration of the imaging device according to the third embodiment. The imaging device further has a control substrate 201, an image pickup substrate 202, a digital signal line group 203, and an analog signal line group 204 in addition to the components described in the first embodiment. The control circuit 105 is implemented on the control substrate 201, and the AFE circuit 101 and the image pickup device 106 are implemented on the image pickup substrate 202. The AFE circuit 101 and the image pickup device 106 are connected to each other by the output line group 104 and the analog signal line group 204. The AFE circuit 101 and the control circuit 105 are connected to each other by the transmission line group 103 and the digital signal line group 203. The transmission line group 103 and the digital signal line group 203 form a control signal line group 205. Note that the control signal line group 205 may further include a power source line and a ground line of the image pickup substrate 202.

The image pickup substrate 202 is provided inside a main body of the image reading apparatus. The image pickup substrate 202 functions as a reading unit that reads a capturing object such as a document. The image pickup substrate 202 is movable within a scan range by being driven by a drive device such as a motor. The control substrate 201 is fixed to the main body of the image reading apparatus. Therefore, the control signal line group 205 is formed of flexible cables such as flexible flat cables so that electrical connections are ensured even when the relative position of the control substrate 201 and the image pickup substrate 202 varies. By using flexible flat cables for the control signal line group 205, it is possible to stably transfer signals between the substrates even when the distance between the control substrate 201 and the image pickup substrate 202 varies by around several meters during reading.

The control circuit 105 outputs a control signal used for driving the image pickup device 106 to the image pickup substrate 202 via the control signal line group 205. This control signal passes through the determination circuit 102 in the AFE circuit 101 and is input to the image pickup device 106 via the output line group 104. In such a way, the control circuit 105 drives the image pickup device 106. Next, the control circuit 105 outputs a control signal used for driving the AFE circuit 101 to the image pickup substrate 202 via the control signal line group 205. This control signal is input to the AFE circuit 101. In such a way, the control circuit 105 drives the AFE circuit 101. Note that the order of driving of the AFE circuit 101 and driving of the image pickup device 106 may be opposite.

The image pickup device 106 has two terminals CH1 and CH2 used for outputting analog signals obtained by capturing. In the present embodiment, the image pickup device 106 outputs analog signals to terminals IN1 and IN2 of the AFE circuit 101 via the analog signal line group 204. The AFE circuit 101 digitally converts the input analog signals to digital signals. The AFE circuit 101 outputs digital signals from terminals OUT1 and OUT2 to the control circuit 105 via the digital signal line group 203.

Also in the present embodiment, the number of control signal lines extending from the control circuit 105 is reduced, and the circuit size can be reduced as with the case of the first embodiment. Further, since the imaging device of the present embodiment is used for the image reading apparatus, the long control signal line group 205 is arranged between the control substrate 201 and the image pickup substrate 202. Thus, transmission noise is likely to occur on the control signal line group 205. To address this, in the present embodiment, since control signal lines from the control circuit 105 to the AFE circuit 101 and the image pickup device 106 can be aggregated, the number of power source lines and ground lines can be increased. When the number of power source lines and ground lines is increased, since variation of the power source voltage and the ground voltage is reduced, transmission noise can be reduced.

Note that the AFE circuit 101 and the image pickup device 106 are implemented on the same substrate in the example described above but may be implemented on separate substrates, respectively. Further, an example in which the number of signal output terminals of the image pickup device 106 is two is illustrated, the number is not limited thereto.

Fourth Embodiment

In the present embodiment, specific configuration examples of an image reading apparatus and an image forming apparatus to which the imaging device described in each of the first to third embodiments is applied will be illustrated. The image reading apparatus and the image forming apparatus are not particularly limited and may be, an image scanner, a copy machine, a multifunction printer, or the like. However, the imaging device according to each of the first to third embodiments is applicable to various apparatuses including a photoelectric conversion device without being limited to the image reading apparatus and the image forming apparatus illustrated in the present embodiment.

Figure 9:
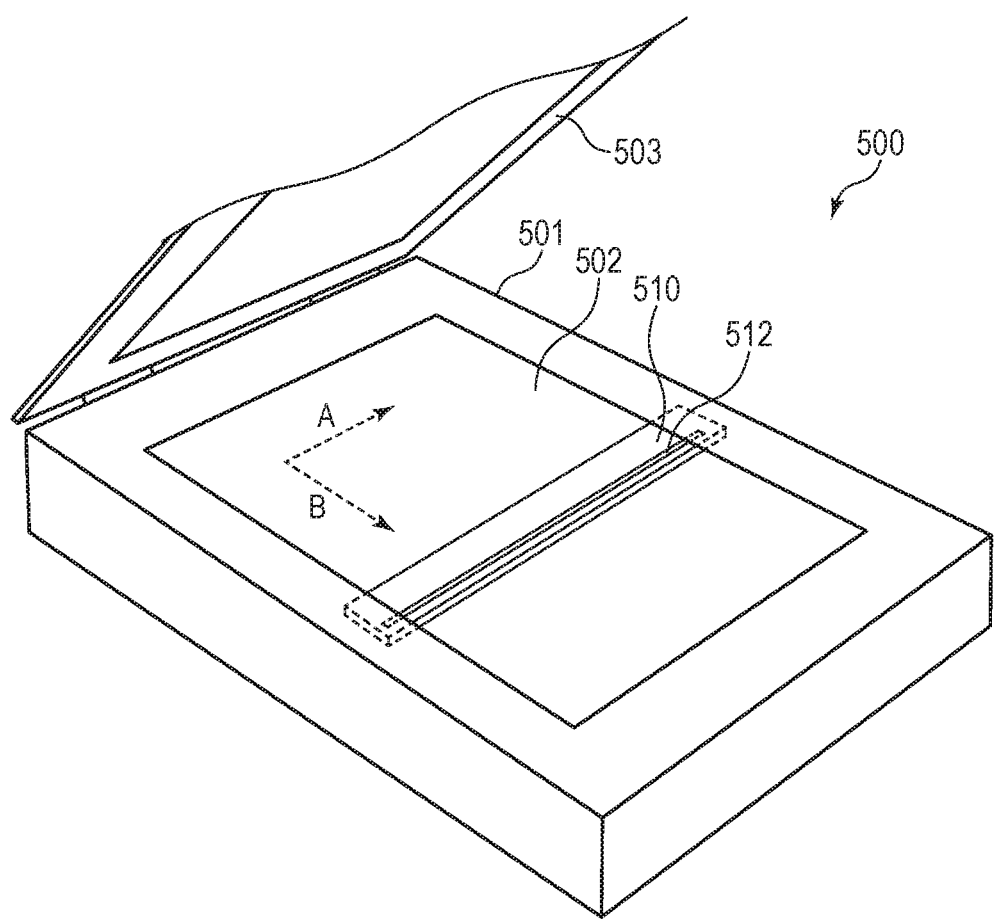
FIG. 9 is a perspective view illustrating a general configuration of an image reading apparatus according to a fourth embodiment.

FIG. 9 is a perspective view illustrating the general configuration of an image reading apparatus 500 according to the present embodiment. As illustrated in FIG. 9, the image reading apparatus 500 according to the present embodiment has an apparatus main body 501 and a document cover 503. FIG. 9 illustrates a perspective external view of the image reading apparatus 500 with the document cover 503 opened.

A transparent plate 502 is attached to the top face of the apparatus main body 501 as a document stage used for placing a document. The transparent plate 502 may be formed of a glass plate, for example. A document to be read is placed on the transparent plate 502 such that an image face to be read is in contact with the transparent plate 502. The document cover 503 is configured to function as a pressing member used for pressing the document placed on the transparent plate 502 against the top face of the transparent plate 502 and is attached to the apparatus main body 501 so as to be able to be opened and closed.

Inside the apparatus main body 501, a reading unit 510 is provided. The reading unit 510 has a plurality of image pickup devices 512 implemented so as to be aligned in the direction of the arrow A. The image pickup device 106 described in each of the first to third embodiments may be used for the image pickup device 512 of the present embodiment. Note that implementation of a plurality of image pickup devices 512 so as to be aligned in such a way is also referred to as tiling. The reading unit 510 can capture a document placed on the transparent plate 502 in a two-dimensional manner by moving in the direction of the arrow B. The image reading apparatus 500 as described above, the direction of the arrow B in which the reading unit 510 or the document moves is referred to as a sub-scanning direction, and the direction of the arrow A orthogonal to the sub-scanning direction is referred to as a main scanning direction.

Figure 10:
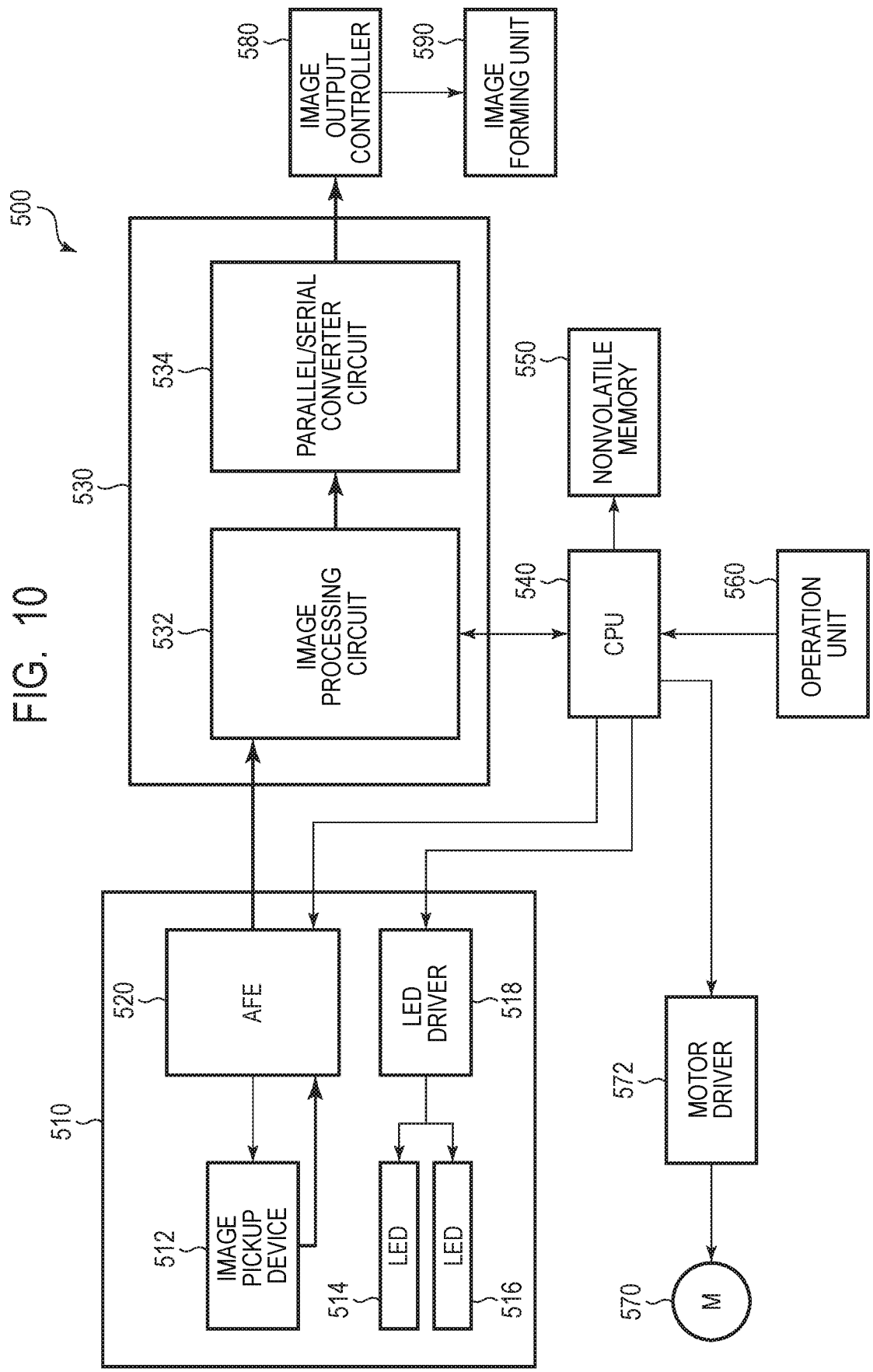
FIG. 10 is a block diagram illustrating a general configuration of the image reading apparatus according to the fourth embodiment.

FIG. 10 is a block diagram illustrating the general configuration of the image reading apparatus 500 according to the present embodiment. As illustrated in FIG. 10, the image reading apparatus 500 according to the present embodiment includes a reading unit 510, an image processing unit 530, a CPU 540, a nonvolatile memory 550, an operation unit 560, a motor 570, a motor driver 572, and an image output controller 580. The reading unit 510 includes an image pickup device 512, LEDs 514 and 516, an LED driver 518, and an AFE 520. The image processing unit 530 includes an image processing circuit 532 and a parallel/serial converter circuit 534. The AFE circuit 101 described in each of the first to third embodiments may be used for the AFE 520 of the present embodiment. Further, the CPU 540 and the image processing unit 530 of the present embodiment function as the control circuit 105 of each of the first to third embodiments.

The CPU 540 reads out a control program stored in the nonvolatile memory 550 and performs the overall control of the image reading apparatus 500. The operation unit 560 is a user interface to which the user inputs a setting of a copy mode such as color copy, monochrome copy, double-sided copy or an instruction of start of copy.

The LED driver 518 receives a timing signal from the CPU 540 and supplies currents used for causing light emitting units, that is, white LEDs 514 and 516 to emit light. Thereby, the LEDs 514 and 516 irradiate an object for reading an image (document) with light. The image pickup device 512 receives light reflected from a document, converts the light into an electric signal by photoelectric conversion, and outputs an analog voltage signal in accordance with an incident light amount. The AFE 520 performs analog processing such as a sample and hold process, an offset process, or a gain process on the analog voltage signal output from the image pickup device 512 and converts the voltage signal subjected to the analog processing into digital data (hereinafter, luminance data). Note that a part or whole of the function of the AFE 520 may be mounted outside the reading unit 510.

The motor 570 moves the reading unit 510 in the sub-scanning direction. The motor driver 572 receives a timing signal from the CPU 540 and supplies an excitation current used for controlling the rotation of the motor 570.

The image processing circuit 532 performs image processing such as a shading correction process, a filtering process, or the like on read data output from the AFE 520. Note that a setting of a filter or the like required for performing image processing is set in a register inside the image processing circuit 532 by the CPU 540 when powered on. The parallel/serial converter circuit 534 converts read data on which various image processing has been performed, which is output as parallel data from the image processing circuit 532, into serial data. The read data converted into serial data is transmitted to the image output controller 580.

The read data transmitted to the image output controller 580 is transmitted to an image forming unit 590. The image forming apparatus is formed of the image reading apparatus 500 and the image forming unit 590. One example of the known image forming unit 590 may be an electrographic image forming unit. The electrographic image forming unit 590 forms an image by developing an electrostatic latent image formed on a photosensitive drum into a toner image and transcribing the toner image to a recording medium such as paper. Thereby, the image forming apparatus can form the image loaded by the image reading apparatus 500 on a recording medium by using the image forming unit.

According to the first to third embodiments, the AFE circuit 101 in which the number of control signal lines is reduced is provided. Therefore, when the AFE circuit 101 of each of the first to third embodiments is used as the AFE 520 of the present embodiment, the image reading apparatus 500 and an image forming apparatus in which the number of control signal lines is reduced are provided.

Further, according to the first to third embodiments, transmission noise may be reduced. In such a case, the image reading apparatus 500 that may acquire a high quality image with less noise and an image forming apparatus that may form a high quality image with less noise are provided.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

Although the control target is the determination circuit 102 when the identifier bit CS is at the high level and the control target is the image pickup device 106 when the identifier bit CS is at the low level in the embodiments described above, the opposite may apply. Further, although the mode is the reading mode when the mode selection bit W is at the high level and the mode is the writing mode when the mode selection bit W is at the low level in FIG. 2 to FIG. 7, the opposite may apply.

Further, although the number of bits of the address bit is six and the number of bits of the data bit is nine in the embodiments described above, these numbers are not limited thereto. Further, the number of bits of the address bit or the data bit may be different between a case where the control target is the AFE circuit 101 and a case where the control target is the image pickup device 106.

Further, although the AFE circuit 101 is used for control of the image pickup device 106 and acquisition of a signal from the image pickup device 106 in the embodiments described above, a use of the AFE circuit 101 is not limited thereto. The AFE circuit 101 may be used for control of a device other than the image pickup device 106 or the like.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-040596, filed Mar. 6, 2019, which is hereby incorporated by reference herein in its entirety.

What is claimed is:

1. A signal processing circuit comprising:
a first terminal to which a control signal including identifier information indicating a control target is input;
a determination circuit configured to determine the control target based on the identifier information; and
a second terminal that is different from the first terminal,
wherein when the determination circuit determines that the control target is the signal processing circuit, the signal processing circuit performs a process in accordance with the control signal,
wherein when the determination circuit does not determine that the control target is the signal processing circuit, the signal processing circuit outputs the control signal from the second terminal, and
wherein the control signal is input to the first terminal from the same control circuit in both a case where the control target is the signal processing circuit and a case where the control target is not the signal processing circuit.

2. The signal processing circuit according to claim 1, wherein a case where the determination circuit does not determine that the control target is the signal processing circuit includes at least a case where the determination circuit determines that the control target is a circuit other than the signal processing circuit.

3. The signal processing circuit according to claim 1, wherein when the determination circuit does not determine that the control target is the signal processing circuit, the signal processing circuit outputs the control signal with the identifier information being masked.

4. The signal processing circuit according to claim 1,
wherein the control signal includes at least one of an address bit and a data bit, and
wherein the identifier information is arranged preceding the address bit and the data bit.

5. The signal processing circuit according to claim 1, wherein the control signal further includes mode selection information indicating whether to perform a process of writing of data to a register or a process of reading of data from a register.

6. The signal processing circuit according to claim 1, wherein the control signal output from the second terminal is used for control of an image pickup device.

7. The signal processing circuit according to claim 1, wherein the signal processing circuit performs a process of converting an analog signal output from the control target controlled by the control signal output from the second terminal into a digital signal.

8. An image reading apparatus comprising:
the signal processing circuit according to claim 1; and
an image pickup device to which the control signal output from the second terminal is input.

9. The image reading apparatus according to claim 8 further comprising:
a main body including a control circuit configured to output the control signal to the first terminal;
a reading unit provided to the main body so as to be movable and including the signal processing circuit and the image pickup device; and
a flexible cable that connects the reading unit and the control circuit to each other.

10. The image reading apparatus according to claim 9, wherein the control circuit is fixed to the main body.

11. An image forming apparatus comprising the image reading apparatus according to claim 8.

12. An image forming apparatus comprising:
a main body including a control circuit; and
a flexible cable used for connecting the control circuit and a reading unit to each other,
wherein the control circuit is configured to output control signals, which include respective identifier information indicating at least one control target selected from a plurality of signal processing circuits of the reading unit, to the reading unit via the flexible cable, and
wherein both of a first control signal whose control target is a first signal processing circuit of the plurality of processing circuits, and a second control circuit whose control target is not the first signal processing circuit are output from the same control circuit to one terminal of the first processing circuit.

* * * * *